(12) United States Patent
Rikkola et al.

(10) Patent No.: US 9,458,903 B2
(45) Date of Patent: Oct. 4, 2016

(54) SYSTEM AND METHOD FOR MONITORING A BRAKE SYSTEM OF A MINING MACHINE

(71) Applicant: Harnischfeger Technologies, Inc., Wilminton (DE)

(72) Inventors: Michael J. Rikkola, New Berlin, WI (US); Shashikiran Gudur, Greenfield, WI (US); Anubhaw Bhushan, Wilwaukee, WI (US)

(73) Assignee: Harnischfeger Technologies, Inc., Wilmington, DE (US)

( * ) Notice: Subject to any disclaimer, the term of this patent is extended or adjusted under 35 U.S.C. 154(b) by 46 days.

(21) Appl. No.: 14/213,637

(22) Filed: Mar. 14, 2014

(65) Prior Publication Data

US 2014/0277964 A1 Sep. 18, 2014

Related U.S. Application Data

(60) Provisional application No. 61/784,067, filed on Mar. 14, 2013.

(51) Int. Cl.

| | |
|---|---|
| *F16D 66/00* | (2006.01) |
| *B60T 8/88* | (2006.01) |
| *B60T 17/22* | (2006.01) |
| *E21C 35/04* | (2006.01) |
| *B60T 13/66* | (2006.01) |
| *G06F 19/00* | (2011.01) |
| *H02P 3/00* | (2006.01) |
| *E02F 3/43* | (2006.01) |
| *F16D 125/00* | (2012.01) |
| *E02F 9/20* | (2006.01) |

(52) U.S. Cl.
CPC ............... *F16D 66/00* (2013.01); *B60T 8/88* (2013.01); *B60T 13/662* (2013.01); *B60T 17/22* (2013.01); *E21C 35/04* (2013.01); *E02F 3/43* (2013.01); *E02F 9/2083* (2013.01); *F16D 2125/00* (2013.01); *G06F 19/00* (2013.01); *H02P 3/00* (2013.01)

(58) Field of Classification Search
None
See application file for complete search history.

(56) References Cited

U.S. PATENT DOCUMENTS

| | | |
|---|---|---|
| 5,347,448 A | 9/1994 | Nam |
| 5,381,874 A | 1/1995 | Hadank et al. |
| 5,892,437 A * | 4/1999 | Scheibe et al. ............... 340/467 |
| 6,145,626 A | 11/2000 | Niemczura et al. |
| 6,213,820 B1 | 4/2001 | Kanno |
| 6,469,638 B1 | 10/2002 | Johnson |

(Continued)

OTHER PUBLICATIONS

"Automatic Fault Analysis and User Notification for predictive Maintenance" by A.P. Apostolov, 2006.

(Continued)

*Primary Examiner* — Rami Khatib
*Assistant Examiner* — Jeffrey Boomer
(74) *Attorney, Agent, or Firm* — Michael Best & Friedrich LLP

(57) ABSTRACT

A mining machine including a brake operable to halt motion of a component of the mining machine; a first sensor operable to sense a characteristic of the brake to generate brake data; a second sensor operable to sense motion of the component of the mining machine to generate motion data; and a controller. The controller is operable to receive the brake data and the motion data, analyze the brake data and the motion data according to a brake set model and a brake release model, and output an alert in response to an issue with the analyzed brake data or the analyzed motion data.

20 Claims, 3 Drawing Sheets

(56) References Cited

U.S. PATENT DOCUMENTS

| | | |
|---|---|---|
| 6,470,247 B1 | 10/2002 | Meyer et al. |
| 7,009,508 B2 | 3/2006 | Vertenten |
| 7,599,775 B2 | 10/2009 | Furuno |
| 7,936,261 B2 | 5/2011 | Rossaert |
| 8,065,342 B1 | 11/2011 | Borg et al. |
| 8,073,653 B2 | 12/2011 | Suzuki et al. |
| 2002/0018724 A1 | 2/2002 | Millet et al. |
| 2004/0255656 A1 | 12/2004 | Rafei |
| 2006/0276185 A1 | 12/2006 | Ram et al. |
| 2008/0282583 A1* | 11/2008 | Koellner ............. E02F 3/304 37/348 |
| 2010/0030490 A1 | 2/2010 | Wright et al. |
| 2010/0188203 A1 | 7/2010 | Wallace et al. |
| 2011/0254679 A1 | 10/2011 | Todd et al. |
| 2011/0300992 A1 | 12/2011 | Richter et al. |
| 2011/0301817 A1* | 12/2011 | Hobenshield et al. ......... 701/50 |
| 2011/0314802 A1* | 12/2011 | Lastre ............... B60T 7/12 60/436 |
| 2012/0022762 A1 | 1/2012 | Rosero |
| 2012/0092150 A1 | 4/2012 | Green et al. |
| 2012/0092180 A1* | 4/2012 | Rikkola et al. ............. 340/679 |
| 2012/0146778 A1* | 6/2012 | Davis et al. ............. 340/425.5 |
| 2012/0232756 A1 | 9/2012 | Yuan et al. |
| 2012/0296574 A1* | 11/2012 | Ooki ............... E02F 9/123 702/35 |
| 2013/0008155 A1* | 1/2013 | Kim ............... E02F 9/128 60/468 |
| 2013/0033090 A1* | 2/2013 | Jokonya ............... 299/30 |
| 2013/0298544 A1* | 11/2013 | Izumi ............... E02F 9/123 60/413 |
| 2013/0317710 A1* | 11/2013 | Sakurai ............... E02F 9/2025 701/50 |
| 2014/0184122 A1* | 7/2014 | Ogawa ............... E02F 9/2095 318/461 |
| 2014/0236432 A1 | 8/2014 | Haisler et al. |
| 2015/0042259 A1* | 2/2015 | Kim, II ............... H02P 3/14 318/703 |

OTHER PUBLICATIONS

"Modeling and Experimental Evaluation of a Load-Sensing and Pressure Compensated Hydraulic System" by Duqiang Wu, Dec. 11, 2004.

"Spectra and BSM Wireless Have Developed a Remote Air Brake Diagnostic and Monitoring Solution for the Trucking Industry", Filing Services Canada Press Release, Normans Media Ltd., by M2 Presswire, Aug. 1, 2006.

Abstract of "A Condition Monitoring System of the Disk Brake Based on nRF24L01", by Xiao Ke and Fu Sheng, Electronic Measurement & Instruments (ICEMI), 2011 10th International Conference, vol. 4, pp. 283-286, Aug. 16-19, 2011.

PCT International Search Report and Written Opinion for Application No. PCT/US2014/016946 dated May 30, 2014 (11 pages).

International Search Report from the International Searching Authority for International Application No. PCT/US2014/029651 dated Aug. 20, 2014 (9 pages).

Written Opinion from the International Searching Authority for International Application No. PCT/US2014/029651 dated Aug. 20, 2014 (6 pages).

PCT/US2014/029651 International Preliminary Report on Patentability and the Written Opinion of the Searching Authority date mailed Sep. 24, 2015 (8 pages).

* cited by examiner

SYSTEM AND METHOD FOR MONITORING A BRAKE SYSTEM OF A MINING MACHINE

RELATED APPLICATION

The present application claims priority to U.S. Provisional Application 61/784,067, filed Mar. 14, 2013, the entire contents of which are hereby incorporated.

BACKGROUND

The present invention relates to monitoring brakes of mining equipment, such as shovels.

SUMMARY

Brakes play a significant role in shovel operations and motion of an electrical shovel (i.e., crowd, hoist, swing, and propel). In particular, an untimely or delayed release of brakes can significantly constrain shovel operations. Also, it is not viable for maintenance personnel to check the condition of brakes every time the brakes are being applied.

Accordingly, embodiments of the present invention provide a brake monitoring algorithm that timely indicates a condition of brakes before the brakes are going to potentially fail or malfunction. This advance notice reduces time spent troubleshooting deteriorating brake conditions and unpredicted downtime. The system captures data regarding brakes, such as brake pressure, brake set time, brake release time, brake indicator status, and relative resolver counts. The system provides an automated alert/notification system that continuously monitors brakes condition during various motions based on this captured data.

In particular, the system applies one more analytics models to analyze the captured data. The model collects data from one or more brake systems included in a shovel (e.g., crowd brakes, swing brakes, hoist brakes, and propel brakes). In some embodiments, the model includes three sub-models: (a) brake set, (b) brake release, and (c) brake pressure. The brake set model registers the time when the break solenoid turns off (the brake solenoid indicates whether there was a command from either the operator or the control system to apply brakes) and the time when there is no change in the motion of the component controlled by the applied brakes.

In particular, applying this logic to a crowd brake system, the brake set model registers the time when the command was issued to set the crowd brakes and, at the same time, monitors the crowd resolver counts and registers the time when there is no change in resolver counts. The model stores the time difference between these two events as the time taken to set the crowd brake. This time difference can then be evaluated against the average time to set the brakes for that individual machine and/or against original equipment manufacturer ("OEM") specifications to determine whether the brake is failing, malfunctioning, or may soon fail or malfunction. In some embodiments, the distance travelled after the bake is set is used to indicate brake health. This distance can be measured using resolver counts. If a malfunction is detected, an alert can be generated. In some embodiments, the alert includes an email generated by the monitoring system as soon as the model identifies any discrepancies or logic violations. The alert notifies a user, such as an operator, owner, maintenance personnel, analyst, etc., associated with the shovel of the detected discrepancies. The alert can also inform the user of the monitored data, such as the brake set time.

Similar to the brake set model, the brake release model registers the time difference between the time the brake solenoid turns on and the time the break release indicator turns on. As described above for the brake set model, this time duration to release a brake is evaluated against the average time duration for that machine and/or OEM specification before sending an alert.

The brake pressure model is designed to collect data and create a pattern on how much pressure on an average is used to apply brakes and also how much time the system takes to attain a certain pressure while releasing a brake. In particular, this model registers the brake pressure when the brake solenoid turns off and on and the pressure when the brake set/release indicator is on and off. In some embodiments, the brake pressure model also monitors conditions of a main air pressure system. For example, brake pressure and main air pressure can be useful for diagnosing brake conditions.

The brake monitoring system described below indicates the overall brake health and brake conditions. Tracking brake health and conditions can be used to identify brake issues before failure. Accordingly, the tracked information can be used to alert operators of brake issues before the issues become urgent or catastrophic, which reduces maintenance time, down time, and unsafe machine operation.

In one embodiment, the invention provides a mining machine including a brake operable to halt motion of a component of the mining machine; a first sensor operable to sense a characteristic of the brake to generate brake data; a second sensor operable to sense motion of the component of the mining machine to generate motion data; and a controller. The controller is operable to receive the brake data and the motion data, analyze the brake data and the motion data according to a brake set model and a brake release model, and output an alert in response to an issue with the analyzed brake data or the analyzed motion data.

In another embodiment the invention provides a method of monitoring health of a brake of a mining machine, the mining machine including a movable component. The method includes sensing a characteristic of the brake to generate brake data; sensing motion of the movable component to generate motion data; analyzing the brake data and the motion data according to a brake set model and a brake release model; and outputting an alert in response to an issue with the analyzed brake data or the analyzed motion data.

Other aspects of the invention will become apparent by consideration of the detailed description and accompanying drawings.

DETAILED DESCRIPTION

Figure 1:
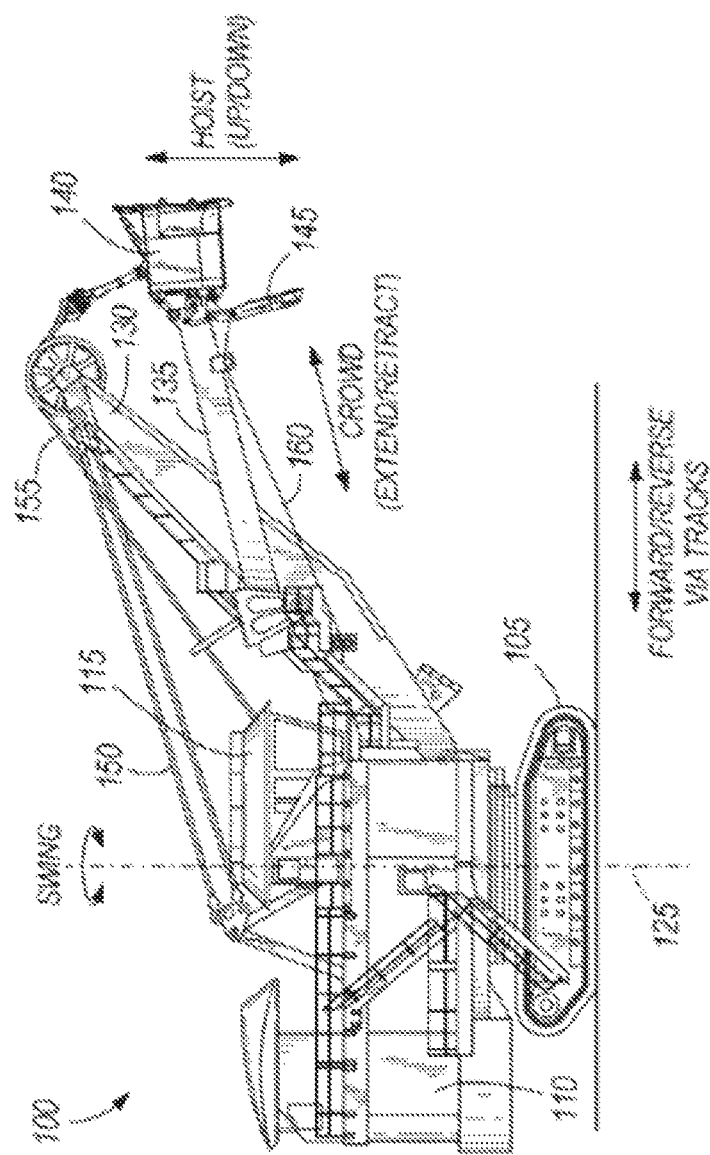
FIG. 1 illustrates a mining shovel according to an embodiment of the invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein are for the purpose of description and should not be regarded as limiting. The use of "including," "comprising," or "having" and variations thereof herein are meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings.

In addition, it should be understood that embodiments of the invention may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software (e.g., stored on non-transitory computer-readable medium and executed by at least one processor). As such, it should be noted that a plurality of hardware and software based devices, as well as a plurality of different structural components may be utilized to implement the invention. Furthermore, and as described in subsequent paragraphs, the specific mechanical configurations illustrated in the drawings are intended to exemplify embodiments of the invention and that other alternative mechanical configurations are possible.

FIG. 1 illustrates a mining shovel 100, such as an electric mining shovel. The embodiment shown in FIG. 1 illustrates the mining machine as a rope shovel, however, in other embodiments the mining shovel 100 is a different type of mining machine, such as, for example, a hybrid mining shovel, a dragline excavator, etc. The mining shovel 100 includes tracks 105 for propelling the rope shovel 100 forward and backward, and for turning the rope shovel 100 (i.e., by varying the speed and/or direction of the left and right tracks relative to each other). The tracks 105 support a base 110 including a cab 115. The base 110 is able to swing or swivel about a swing axis 125, for instance, to move from a digging location to a dumping location. Movement of the tracks 105 is not necessary for the swing motion. The rope shovel further includes a dipper shaft 130 supporting a pivotable dipper handle 135 (handle 135) and a dipper 140. The dipper 140 includes a door 145 for dumping contents from within the dipper 140 into a dump location, such as a hopper or a dump-truck.

The rope shovel 100 also includes taut suspension cables 150 coupled between the base 110 and dipper shaft 130 for supporting the dipper shaft 130; a hoist cable 155 attached to a winch (not shown) within the base 110 for winding the cable 155 to raise and lower the dipper 140; and a dipper door cable 160 attached to another winch (not shown) for opening the door 145 of the dipper 140. In some instances, the rope shovel 100 is a Joy Global Surface Mining® 4100 series shovel produced by Joy Global Inc., although the electric mining shovel 100 can be another type or model of mining equipment.

When the tracks 105 of the mining shovel 100 are static, the dipper 140 is operable to move based on three control actions, hoist, crowd, and swing. The hoist control raises and lowers the dipper 140 by winding and unwinding hoist cable 155. The crowd control extends and retracts the position of the handle 135 and dipper 140. In one embodiment, the handle 135 and dipper 140 are crowded by using a rack and pinion system. In another embodiment, the handle 135 and dipper 140 are crowded using a hydraulic drive system. The swing control swivels the handle 135 relative to the swing axis 125. Before dumping its contents, the dipper 140 is maneuvered to the appropriate hoist, crowd, and swing positions to 1) ensure the contents do not miss the dump location; 2) the door 145 does not hit the dump location when released; and 3) the dipper 140 is not too high such that the released contents would damage the dump location.

Figure 2:
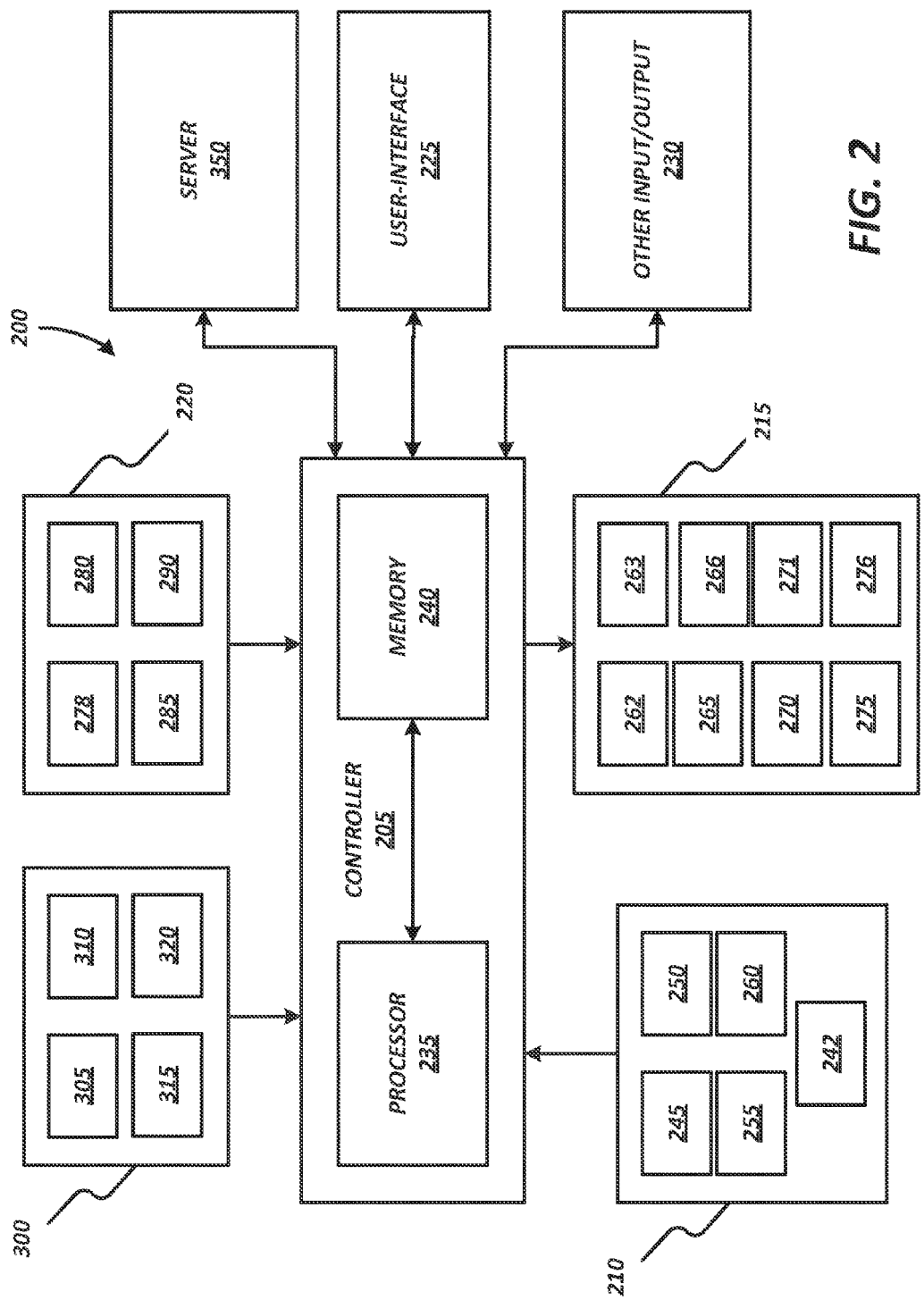
FIG. 2 illustrates a control system of the mining shovel of FIG. 1.

As shown in FIG. 2, the mining shovel 100 includes a control system 200. The control system 200 includes a controller 205, operator controls 210, mining shovel controls 215, sensors 220, a user interface 225, and other input/outputs 230. The controller 205 includes a processor 235 and a non-transitory memory 240. The memory 240 stores instructions executable by the processor 235 and various inputs/outputs for, e.g., allowing communication between the controller 205 and the operator or between the controller 205 and sensors 220. The memory 240 includes, for example, a program storage area and a data storage area. The program storage area and the data storage area can include combinations of different types of memory, such as read-only memory ("ROM"), random access memory ("RAM") (e.g., dynamic RAM ["DRAM"], synchronous DRAM ["SDRAM"], etc.), electrically erasable programmable read-only memory ("EEPROM"), flash memory, a hard disk, an SD card, or other suitable magnetic, optical, physical, or electronic memory devices.

The processor 235 is connected to the memory 240 and executes software instructions that are capable of being stored in the memory 240. Software included in the implementation of the mining shovel 100 can be stored in the memory 240 of the controller 205. The software includes, for example, firmware, one or more applications, program data, filters, rules, one or more program modules, and other executable instructions. The processor 235 is configured to retrieve from memory 240 and execute, among other things, instructions related to the control processes and method described herein. In some instances, the processor 235 includes one or more of a microprocessor, digital signal processor (DSP), field programmable gate array (FPGA), application specific integrated circuit (ASIC), or the like.

The controller 205 receives input from the operator controls 210. The operator controls 210 include a propel control 242, a crowd control 245, a swing control 250, a hoist control 255, and a door control 260. The propel control 242, crowd control 245, swing control 250, hoist control 255, and door control 260 include, for instance, operator controlled input devices such as joysticks, levers, foot pedals, and other actuators. The operator controls 210 receive operator input via the input devices and output digital motion commands to the controller 205. The motion commands include, for example, left track forward, left track reverse, right track forward, right track reverse, hoist up, hoist down, crowd extend, crowd retract, swing clockwise, swing counterclockwise, and dipper door release.

Upon receiving a motion command, the controller 205 generally controls mining shovel controls 215 as commanded by the operator. The mining shovel controls 215 include one or more propel motors 262, one or more crowd motors 265, one or more swing motors 270, and one or more hoist motors 275. The mining shovel controls 215 further include one or more propel brakes 263, one or more crowd brakes 266, one or more swing brakes 271, and one or more hoist brakes 276, which are used to decelerate the respective movements of the mining shovel 100. In some embodiments, the brakes are electrically controlled brakes (e.g., solenoid brakes). In embodiments where the brakes are solenoid brakes, a spring engages the brake when the solenoid is powered off, and the brake is disengaged, or released, when the solenoid is powered on. In other embodiments, the brakes include a mechanical brake and a solenoid brake.

During operation of the shovel 100, if the operator indicates via swing control 250 to rotate the handle 135 counterclockwise, the controller 305 will generally control the swing motor 270 to rotate the handle 135 counterclockwise. Once the operator indicates via swing control 250 to decelerate the handle 135, the controller 305 will generally control the swing brake 271 to decelerate the handle 135. However, in some embodiments of the invention, the controller 205 is operable to limit or modify the operator motion commands and/or generate motion commands independent of the operator input.

The controller 205 is also in communication with a number of sensors 220 to monitor the location and status of the dipper 140. For example, the controller 205 is in communication with one or more propel sensors 278, one or more crowd sensors 280, one or more swing sensors 285, and one or more hoist sensors 290. The propel sensors 278 indicate to the controller 205 data (e.g., position, speed, directions, etc.) concerning the tracks 105. The crowd sensors 280 indicate a level of extension or retraction of the dipper 140. The swing sensors 285 indicate a swing angle of the handle 135. The hoist sensors 290 indicate a height of the dipper 140 based on the hoist cable 155 position. In some embodiments, one or more of the propel sensors 278, the crowd sensors 280, the swing sensors 285, and the hoist sensors 290 include resolvers that indicate an absolute position or relative movement of the motors used to move the dipper 140 (e.g., a crowd motor, a swing motor, and/or a hoist motor). For instance, as the hoist motor 275 rotates to wind the hoist cable 155 to raise the dipper 140, the hoist sensors 290 output a digital signal indicating an amount of rotation of the hoist and a direction of movement to indicate relative movement of the dipper 140. The controller 205 translates these outputs into a position, change in position (e.g., a distance travelled), a speed, and/or an acceleration of the dipper 140.

In some embodiments, the sensors 220 also include door latch sensors that, among other things, indicate whether the dipper door 145 is open or closed and measure a weight of a load contained within the dipper 140. The sensors 220 can also include one or more weight sensors, acceleration sensors, and/or inclination sensors to provide additional information to the controller 205 about the load within the dipper 140.

The controller 205 is also in communication with a number of brake sensors 300 to monitor the various brake systems. For example, the controller 205 is in communication with one or more propel brake sensors 305, one or more crowd brake sensors 310, one or more swing brake sensors 315, and one or more hoist brake sensors 320. The brake sensors 300 monitor the respective one or more propel brakes 263, the one or more crowd brakes 266, the one or more swing brakes 271, and the one or more hoist brakes 276. In some embodiments, the brake sensors 300 sense data regarding one or more brake models, such as a brake set time, a brake release time, and a brake pressure. In other embodiments, the brake sensors 300 monitor other data and characteristics regarding one or more brakes.

As noted above in the summary section, a brake set time is the amount of time it takes to set the brakes. In some embodiments, the brake set time is the time difference between the time a brake is engaged (e.g., the solenoid is powered off) and the time when there is no change in motion of the respective component braked by the engaged brake. In other embodiments, the brake set time is the time difference between the time a brake is engaged (e.g., the solenoid is powered off) and the time a brake set indicator, which indicates that the brakes are set, turns on. In another embodiment, the distance traveled after the brake is set is used to indicate brake health. This distance is measured using resolver counts.

A brake release time is the amount of time it takes to release the brakes. In some embodiments, the brake release time is the time difference between the time a brake is disengaged (e.g., the solenoid is powered on) and the time when a break release indicator, which indicates the brakes are released, turns on. An untimely release of brakes may indicate a possible future brake failure (e.g., brake locking, brake damage, etc.). Therefore, if a brake release time falls outside of an optimal or expected value or range, the brake may require maintenance to correct brake release time and/or prevent further deterioration of brake conditions (i.e., prevent a future brake failure). For example, when brake settings or components (e.g., hydraulic fluid) are improperly configured (e.g., worn, damaged, misaligned), a brake may not release as fast as desired or may release too fast.

A brake pressure is the pressure used by the brakes. In some embodiments, the brake pressure is how much pressure on average is utilized when applying the brakes. In some embodiments, a brake pressure further indicates the amount of time it takes to attain a certain pressure when a brake is disengaged. If the amount of brake pressure applied by a brake falls outside of an optimal or expected value or range, the brake may require maintenance to correct brake pressure and/or prevent further deterioration of brake conditions. Similarly, if the time it takes to achieve a particular brake pressure falls outside of an optimal or expected value or range, the brake may require maintenance to correct brake application and/or prevent further deterioration of brake conditions. For example, achieving a less-than-optimal brake pressure or achieving a desired brake pressure too quickly or too slowly may indicate a possible future brake failure (e.g., brake locking, brake damage, etc.). These situations may occurs when there is a brake failure or deterioration (e.g., hydraulic fluid leak, worn brake components, misaligned brake components, improper brake settings, etc.).

The controller 205 receives the sensed data from the brake sensors 300 and applies the models described above in the summary section to monitor one or more brake systems associated with the sensors 300. For example, as described above, the controller 205, executing the models, compares the received sensed brake data to averages or other statistics of previously-recorded brake release data, OEM specifications, or previously-recorded brake release data and OEM specifications, to determine if there are any discrepancies that would indicate an impending brake failure, malfunction, or general replacement.

If the controller 205 determines that there are any issues or discrepancies with the sensed brake data, such as a possible future failure, the controller 205 generates an alert. As noted above, the alert can include an e-mail message. In other embodiments, the alert includes a visual, audible, or haptic alert provided directly to an operator of the shovel 100 (e.g., via the user interface 225).

In some embodiments, the controller 205 is connected to a server 350 via one or more wired and/or wireless networks (e.g., a local area network, a wide area network, a telephone network, the Internet, etc.). The controller 205 outputs the brake sensor data to the server 350. In such an embodiment, the server 350 applies the models described above to process the brake sensor data and monitor one or more brakes of the shovel 100 for possible faults or other issues. If the server 350 determines that there is an issue with the sensed brake data, such as a possible future failure, the server 350 generates an alert, such as an e-mail message. In other embodiments, the server 350 indicates an issue to the operator via the user interface 225 or a remote user interface.

Figure 3:
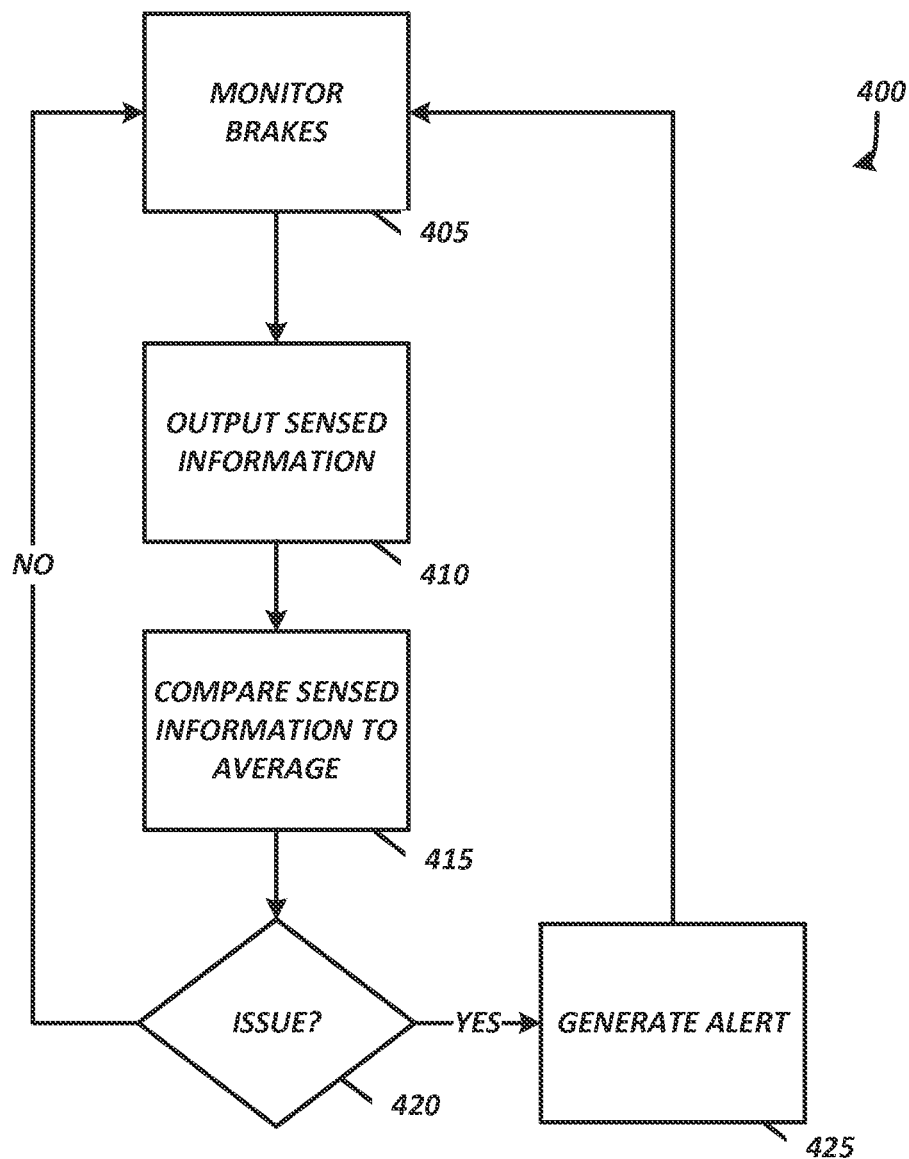
FIG. 3 illustrates a brake monitoring process or method performed by the control system of FIG. 2.

For example, FIG. 3 illustrates a brake monitoring process or method 400 performed by the controller 205, the server 350, or a combination thereof. As illustrated in FIG. 3, one or more brake sensors 300 monitor the one or more propel brakes 263, one or more crowd brakes 266, one or more swing brakes 271, and/or one or more hoist brakes 276 (at 405). The one or more brake sensors 300 output the sensed data to the controller 205 and/or the server 350 (at 410). The controller 205 and/or the server 350, executing one or more brake models, compares the sensed data to averages of previously-recorded sensed brake data for the particular mining shovel 100 and, in some embodiments, OEM specifications (at 415). The controller 205 and/or the server 350 uses the disclosed models to determine if there is an issue with one or more of the brakes (at 420). If there is an issue, the controller 205 and/or the server 350 generates an alert (at 425).

It should be understood that the systems and methods described herein can monitor a brake system of a mining machine and compare detected brake conditions (e.g., brake set time, brake release time, brake pressure amount, brake pressure time, etc.) to one or more values or thresholds to identify the health of the brake system and whether any maintenance is required or recommend to prevent future brake failures or improper operation. For example, a brake set time can be compared to a first threshold value or range to identify whether the brake system has failed and a second threshold value or range to identify whether the brake system needs maintenance to keep the brake system from failing or performing improperly. Different alerts can be generated based on where the monitored brake conditions falls with respect to the one or more values or ranges. Furthermore, the values or ranges can be static (e.g., set by the manufacturer) and/or can dynamically change (e.g., based on past performance of the brake system or other brake systems, such as averages, means, medians, etc.).

Also, in some embodiments, the systems and methods use a combination of monitored brake conditions to identify the health of the brake system. For example, an alert recommending maintenance can be generated when the brake set time model indicates maintenance is recommended and the brake pressure amount model indicates maintenance is recommended (but not when only one of the models indicates that maintenance is recommended). Furthermore, the models themselves can use more than one condition. For example, the brake set time model can use a monitored brake set time and a monitored brake pressure amount to determine brake health.

Thus, the invention provides, among other things, a system and method of monitoring a brake system of a mining machine. Various features and advantages of the invention are set forth in the following claims.

What is claimed is:

1. A mining machine comprising:
a motor operable to move a component of the mining machine;
a brake operable to halt motion of the component of the mining machine;
a first sensor operable to sense a characteristic of the brake to generate brake data;
a second sensor operable to sense relative movement of the motor to generate motion data; and
a controller operable to
receive the brake data and the motion data,
analyze the brake data and the motion data according to a brake set model, the brake set model including determining a brake set time of the component, the brake set time being a time difference between a first time, when the brake is engaged, and a second time, when the second sensor indicates substantially no motion of the component braked by the engaged brake, and
output an alert in response to an issue with the analyzed brake data or the analyzed motion data.

2. The mining machine of claim 1, wherein the brake pressure model further includes comparing the sensed brake pressure to an average brake pressure.

3. The mining machine of claim 1, wherein the brake set model is based on comparing the brake set time to an average brake set model time period.

4. The mining machine of claim 1, wherein the brake release model is based on comparing a brake release time to an average brake release model time period.

5. The mining machine of claim 4, wherein the brake release indicator indicates that a brake solenoid has been activated.

6. The mining machine of claim 1, wherein the alert is output to a network.

7. The mining machine of claim 1, wherein the alert is output to a user.

8. The mining machine of claim 1, wherein the alert shuts down the mining machine.

9. The mining machine of the claim 1, wherein the controller is further operable to analyze the brake data and the motion data according to a brake release model, wherein analyzing the brake data and the motion data according to the brake release model includes determining a brake release time of the component, the brake release time being a time difference between a third time when the brake is disengaged, and a fourth time a brake release indicator, which indicates that the brakes are released, turns on.

10. The mining machine of claim 1, wherein the controller is further operable to analyze the brake data and the motion data according to a brake pressure model, the brake pressure model including determining an average time period in which a brake pressure sensed by the first sensor reaches a predetermined threshold.

11. A method of monitoring health of a brake of a mining machine, the mining machine including a movable component and a motor operable to move the movable component; the method comprising;
sensing, with a first sensor, a characteristic of the brake to generate brake data;
sensing, with a second sensor, relative movement of a motor to generate motion data;
analyzing, using a controller, the brake data and the motion data according to a brake set model, the brake set model including determining a brake set time of the movable component, the brake set time being a time difference between a first time, when the brake is engaged, and a second time, when the second sensor indicates substantially no motion of the movable component braked by the engaged brake; and
outputting the alert on a user interface an alert in response to an issue with the analyzed brake data or the analyzed motion data.

12. The method of claim 11, wherein the brake pressure model further includes comparing the sensed brake pressure to an average brake pressure.

13. The method of claim 11, wherein the brake set model is based on comparing the brake set time to an average brake set model time period.

14. The method of claim 11, wherein the brake release model is based on comparing the brake release time to an average brake release model time period.

15. The method of claim 14, wherein the brake release indicator indicates that a brake solenoid has been activated.

16. The method of claim 11, wherein the alert is output to a network.

17. The method of claim 11, wherein the alert is output to a user.

18. The method of claim 11, wherein the alert shuts down the mining machine.

19. The method of claim 11, wherein the analyzing is performed locally by a controller of the mining machine.

20. The method of claim 11, further comprising outputting the brake data and the motion data to a remote server, wherein the remote server performs the steps of analyzing of the brake data and the motion data.

* * * * *